United States Patent
Giovannetti

(10) Patent No.: US 12,478,182 B2
(45) Date of Patent: Nov. 25, 2025

(54) DEVICE FOR SUPPORTING AND FIXING FURNITURE SHELVES

(71) Applicant: EFFEGI BREVETTI S.R.L., Segrate (IT)

(72) Inventor: Antonio Giovannetti, Segrate (IT)

( * ) Notice: Subject to any disclaimer, the term of this patent is extended or adjusted under 35 U.S.C. 154(b) by 9 days.

(21) Appl. No.: 18/000,591

(22) PCT Filed: Jan. 27, 2021

(86) PCT No.: PCT/EP2021/051855
§ 371 (c)(1),
(2) Date: Dec. 2, 2022

(87) PCT Pub. No.: WO2021/254665
PCT Pub. Date: Dec. 23, 2021

(65) Prior Publication Data
US 2023/0248147 A1    Aug. 10, 2023

(30) Foreign Application Priority Data
Jun. 16, 2020 (IT) .......................... 102020000014326

(51) Int. Cl.
A47B 96/06        (2006.01)
(52) U.S. Cl.
CPC .................. *A47B 96/066* (2013.01)
(58) Field of Classification Search
CPC ....... A47B 96/02; A47B 96/06; A47B 96/066; A47B 96/07; Y10T 24/44026;
(Continued)

(56) References Cited

U.S. PATENT DOCUMENTS 3,879,906 A  *  4/1975  Hollenberg ............... F16B 9/02
                                                                 248/188
6,986,488 B2 *  1/2006  Migli ...................... F16B 12/24
                                                                 248/250
(Continued)

FOREIGN PATENT DOCUMENTS

EP      1228721 A1    8/2002
GB      2494462 A     3/2013
(Continued)

OTHER PUBLICATIONS

Definition of longitudinal, The Free Dictionary, https://www.thefreedictionary.com/longitudinal (Year: 2025).*
(Continued)

*Primary Examiner* — Jonathan Liu
*Assistant Examiner* — Guang H Guan
(74) *Attorney, Agent, or Firm* — Egbert, McDaniel & Swartz, PLLC

(57) ABSTRACT

Disclosed is a device for supporting and fixing shelves of furniture items, such as bookcases, shelf units and the like. The device includes a casing of substantially cylindrical shape, inside whereof is mounted a pin that is stressed by a compression spring, the device being inserted in the edge of a shelf, with a tip of the pin normally protruding from the edge of the shelf and apt to re-enter the casing when the shelf is brought into interference with a wall of the furniture item, wherein a cam element is provided for the actuation of the pin between a position of maximum extraction and a position of minimum extraction of the tip from the casing, the pin being free to spring to re-enter the casing when the cam element is in the positions of maximum and minimum extraction of the tip.

8 Claims, 9 Drawing Sheets

(58) Field of Classification Search
CPC .............. Y10T 403/33; Y10T 403/335; F16B 12/2009; F16B 12/2027; F16B 12/2036; F16B 12/24; F16B 12/26; F16B 2012/2018

See application file for complete search history.

(56) References Cited

U.S. PATENT DOCUMENTS

| | | | |
|---|---|---|---|
| 10,034,542 B2* | 7/2018 | Giovannetti | ........ A47B 47/0091 |
| 10,280,960 B2* | 5/2019 | Giovannetti | ........ F16B 12/2027 |
| 10,605,286 B2* | 3/2020 | Giovannetti | .......... F16B 13/068 |
| 11,098,740 B2* | 8/2021 | Giovannetti | ............. A47C 4/02 |
| 11,268,556 B2* | 3/2022 | Giovannetti | ........ F16B 12/2027 |
| 11,644,054 B2* | 5/2023 | Rovoletto | ............ F16B 12/2036 411/32 |
| 11,877,657 B2* | 1/2024 | Cattaneo | ................. F16B 12/24 |
| 12,239,226 B2* | 3/2025 | Giovannetti | ......... A47B 96/066 |
| 12,364,334 B2* | 7/2025 | Cattaneo | ............. A47B 96/066 |
| 2022/0243752 A1* | 8/2022 | Cattaneo | .............. A47B 57/485 |
| 2023/0248147 A1* | 8/2023 | Giovannetti | ............ F16B 12/32 248/205.1 |
| 2023/0380595 A1* | 11/2023 | Cattaneo | .............. A47B 96/066 |
| 2023/0404262 A1* | 12/2023 | Cattaneo | .............. A47B 96/066 |
| 2024/0016291 A1* | 1/2024 | Cattaneo | ................. F16B 12/24 |
| 2024/0074581 A1* | 3/2024 | Giovannetti | ............ A47B 57/20 |
| 2024/0260755 A1* | 8/2024 | Giovannetti | ......... A47B 96/066 |
| 2025/0185806 A1* | 6/2025 | Cattaneo | ................. F16B 12/24 |
| 2025/0188971 A1* | 6/2025 | Cattaneo | .............. A47B 96/066 |

FOREIGN PATENT DOCUMENTS

| | | |
|---|---|---|
| IT | MI20030052 U1 | 8/2004 |
| WO | 2015158622 A1 | 10/2015 |
| WO | 2018/015090 A1 | 1/2018 |

OTHER PUBLICATIONS

Definition of slot, The Free Dictionary, https://www.thefreedictionary.com/slot (Year: 2025).*
International Search Report for corresponding PCT/EP2021/051855 dated Mar. 13, 2021.
Written Opinion of the International Searching Authority for corresponding PCT/EP2021/051855 dated Mar. 13, 2021.
Notice of Opposition filed against EP3944732B1 on May 2, 2023.
Fixtures Catalogue EFFEGIBREVETTI dated Sep. 2011, Picture of Fixture Device RSX12025X30, Purchase Invoice of Fixture Device RSX12025X30.

* cited by examiner

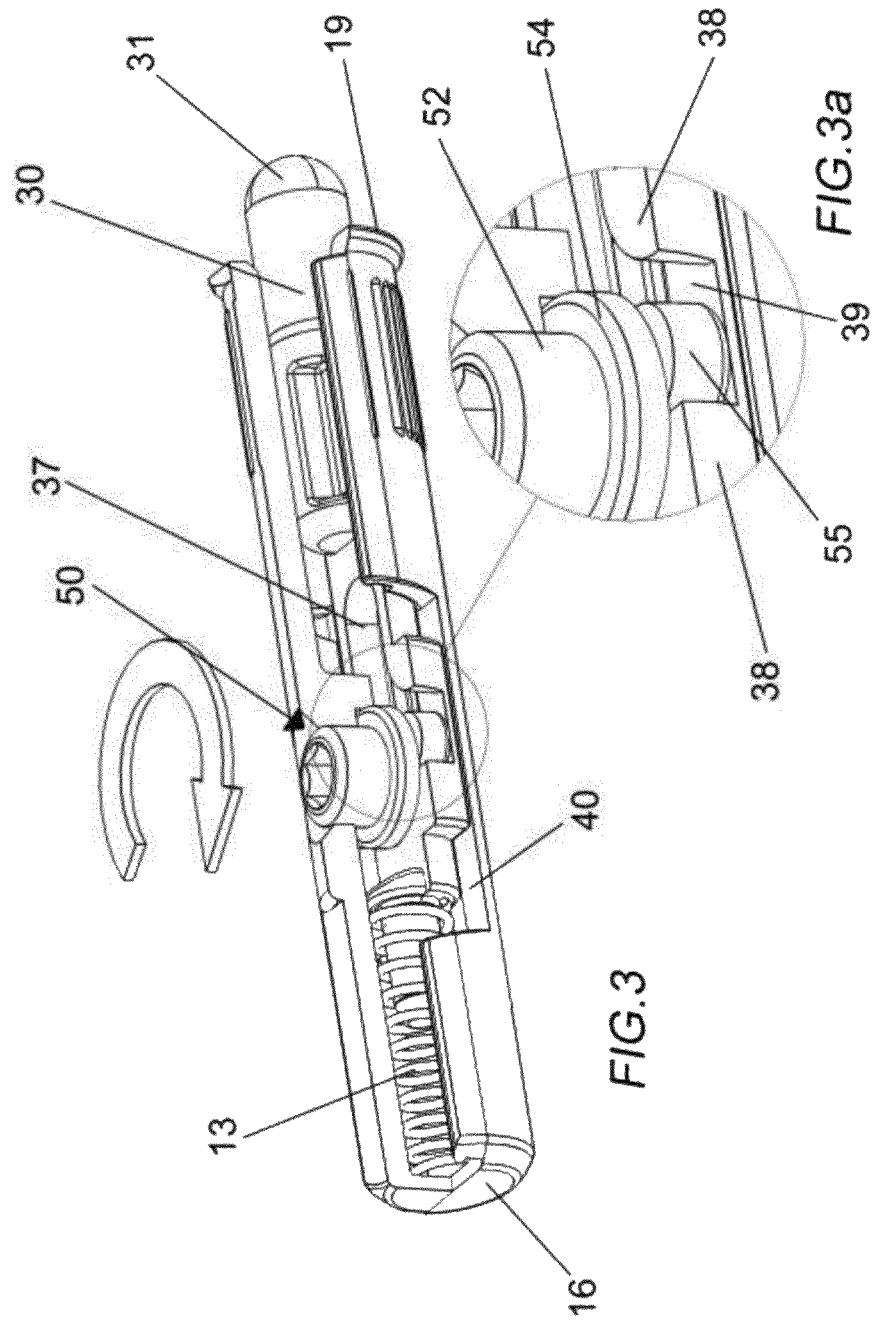

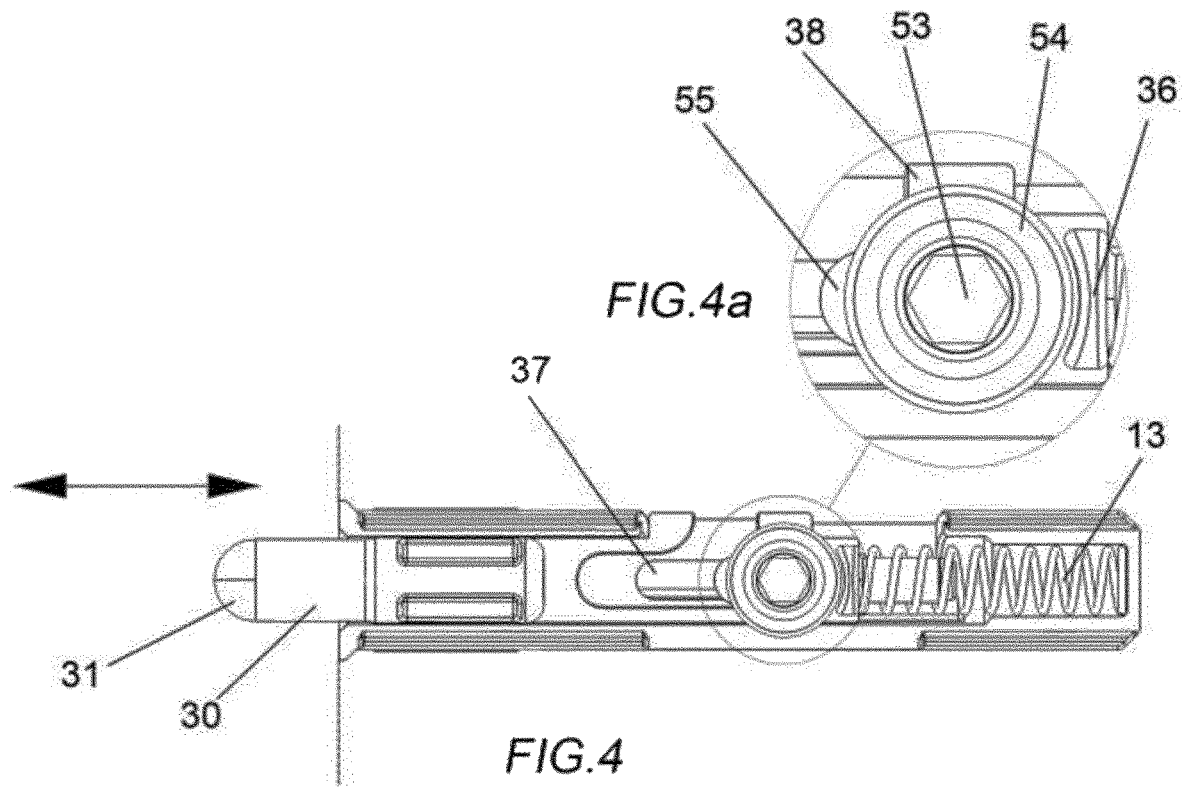
FIG.4a
FIG.4
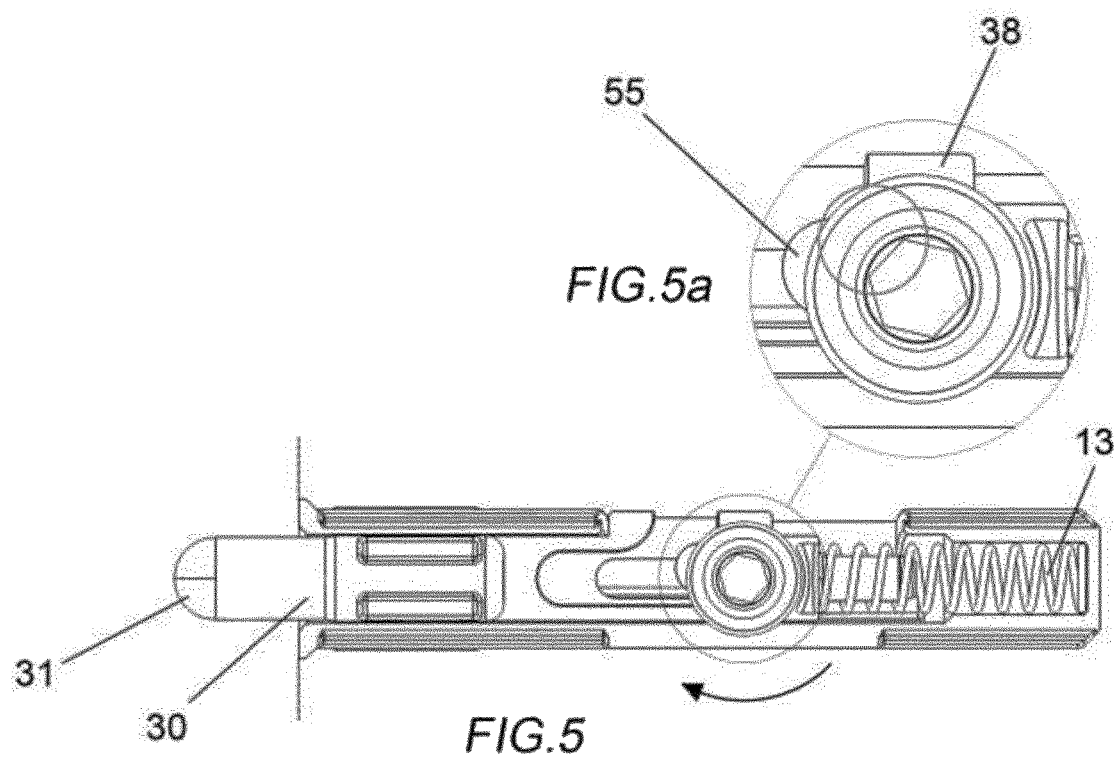
FIG.5a
FIG.5

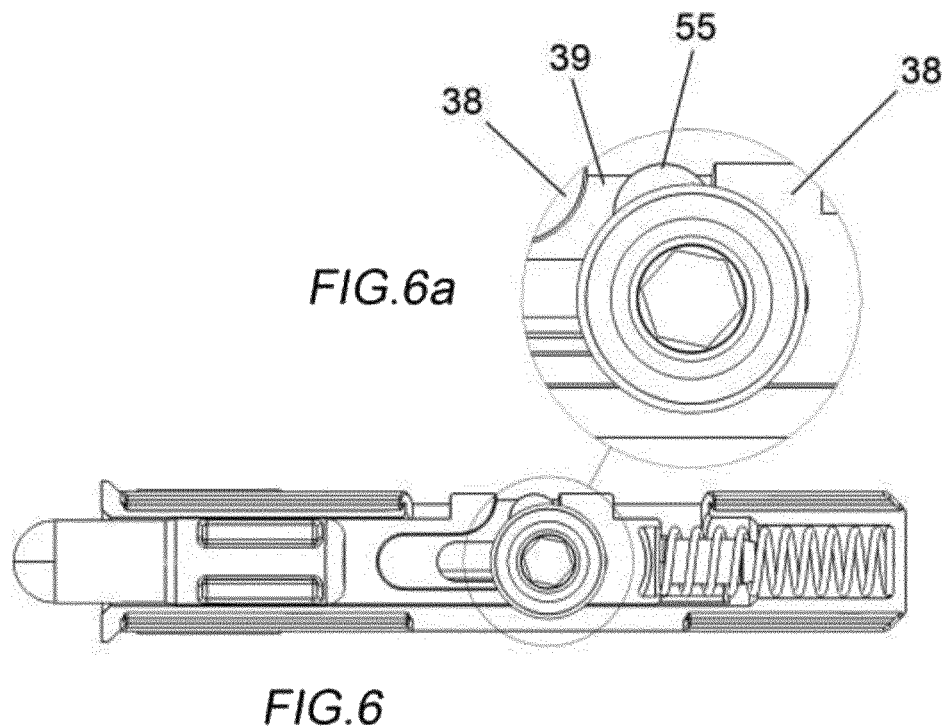
FIG.6a
FIG.6
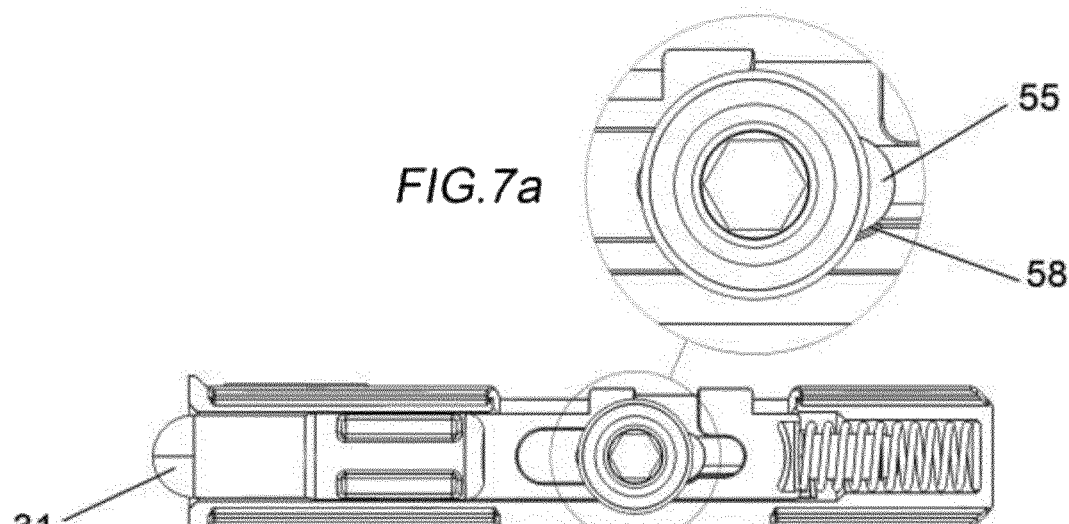
FIG.7a
FIG.7

F

DEVICE FOR SUPPORTING AND FIXING FURNITURE SHELVES

BACKGROUND OF THE INVENTION

1. Field of the Invention

The present invention relates to a device for supporting and fixing furniture shelves, also known as a shelf support.

2. Description of Related Art Including Information Disclosed Under 37 CFR 1.97 and 37 CFR 1.98.

Referring, by way of an example, to an item of furniture of the bookcase type or to a shelf unit, it typically comprises two uprights or vertical walls parallel one to the other, between which are interposed one or more horizontal shelves having the function of defining a support and resting surface for books, magazines, vases and/or other multiple and different objects.

The shelves are arranged and fixed between the vertical walls using means of various type, normally separate from the shelf, such as brackets, screws, pins and the like, which need to be mounted with special tools. This solution is not satisfactory, on the one hand because it makes assembly of the shelf somewhat laborious, and on the other hand because the means of fixing remain visible.

In order to seek to overcome these problems, shelf support devices have been proposed consisting of an elastic pin that is inserted into an edge of the shelf and having a protruding part that engages in a corresponding seat formed in a wall of the furniture item, under the action of a spring. The pin is normally protruding from the device, due to the action of the spring and, on mounting the shelf, it enters in interference with the vertical wall of the furniture item, returning into the device to snap out of it when it is opposite the special seat formed in the wall of the furniture item. To disassemble the shelf, it is necessary to use a special tool on the device, through an opening formed in the shelf, to cause the pin to return against the action of the spring.

Such a device, not having stopping points for the pin, is rather complicated to install and inconvenient to use.

EP 1228721 A1 describes a device comprising a casing which is inserted into an edge of the shelf, inside whereof an elastic pin is placed, normally protruding from the shelf and capable of retracting into the casing when the shelf is brought into interference with the furniture item wall. On the pin two pairs of protrusions are provided to co-operate with elastic tongues protruding inside the casing, a first pair of protrusions determining an unstable engagement for the free ends of the fins, in such a way as to allow the pin to exit during the assembly of the shelf, while the second pair of protrusions constitutes an end stop for the exit of the pin. In order to enable the shelf to be disassembled, a tool, such as a screwdriver, must be used on a slider of the pin to bring said first pair of protrusions into stable engagement with the fins so as to keep the pin in a retracted position in the casing. For this purpose, the casing has a base with a slot in which said slider is placed. In order to be able to house the casing in the shelf, a hole is made with a large window open on the edge, so that the base is placed in this window remaining outside the shelf.

This device is not practical in use, as the pin always protrudes to a maximum from the casing when in rest condition, therefore also when mounting the shelf.

The linear actuation of the slider against the spring action is also not easy.

In addition, the base with the slot for access to the slider remains visible on the outside of the shelf, which is rather unsightly.

WO 2015/158622 describes a device for supporting and fixing furniture shelves according to the preamble to independent claim 1.

An object of the present invention is to overcome the above-mentioned disadvantages.

More particularly, an object of the present invention is to provide a device for supporting and fixing furniture shelves which has a compact structure, such as to be substantially completely hidden from view so as to optimise the aesthetic value of the furniture item.

Another object of the invention is to provide such a device that allows easy and rapid assembly and disassembly of the shelf.

A further object of the present invention is to provide such a support and fixing device in which the elastic pin can be actuated simply and safely, and be arranged in several operating positions, ensuring a stable fixing of the shelf.

Yet another object of the invention is to provide such a device which is simple and economical to manufacture.

These and other objects are achieved by the device of the invention that has the features claimed in claim 1.

BRIEF SUMMARY OF THE INVENTION

According to the invention a device is provided for supporting and fixing shelves of furniture, such as bookcases, shelf units and the like, comprising a casing of substantially cylindrical shape, inside whereof is mounted a pin which is stressed by a compression spring, said device being inserted in the edge of a shelf, with a tip of the pin normally protruding from the edge of the shelf and apt to re-enter said casing when the shelf is brought into interference with a wall of the furniture item, wherein a cam element is provided for the actuation of said pin between a position of maximum extraction and a position of minimum extraction of said pin from the casing, the pin being free to spring to re-enter the casing when the cam element is in said positions of maximum and minimum extraction of the tip, characterised in that said cam element has an eccentric lobe which can be positioned in two opposed positions in a longitudinal slot of the pin, determining said positions of maximum and minimum extraction of the tip, and acting against a projection protruding on one side of the slot beyond the profile of the pin to cause the retraction of the tip from said position of maximum extraction to said position of minimum extraction following a rotation of the cam element, said casing having a longitudinal lateral window in which said projection moves during sliding of the pin in the casing.

Advantageous embodiments of the invention are disclosed by the dependent claims.

BRIEF DESCRIPTION OF THE SEVERAL VIEWS OF THE DRAWING(S)

The constructional and functional features of the device for supporting and fixing shelves of the present invention will be made clearer by the following detailed description in which reference is made to the accompanying drawings which represent a preferred and non-limiting embodiment thereof and in which:

FIG. 1 schematically represents an axonometric view of a device for supporting and fixing furniture shelves of the present invention;

FIG. 3 is a partial cutaway view of the device in the orientation of FIG. 2a, showing the positioning of the cam element;

FIG. 3a is an enlargement of the circled detail of FIG. 3;

FIGS. 4, 5, 6, 7, 8 are plan views from above, with a part of the casing removed, showing a sequence of positions of the elastic pin during disassembly of the shelf;

FIGS. 4a, 5a, 6a, 7a, 8a, are enlargements showing the different positions of the cam element in the sequence of the preceding drawings;

DETAILED DESCRIPTION OF THE INVENTION

Figure 1:
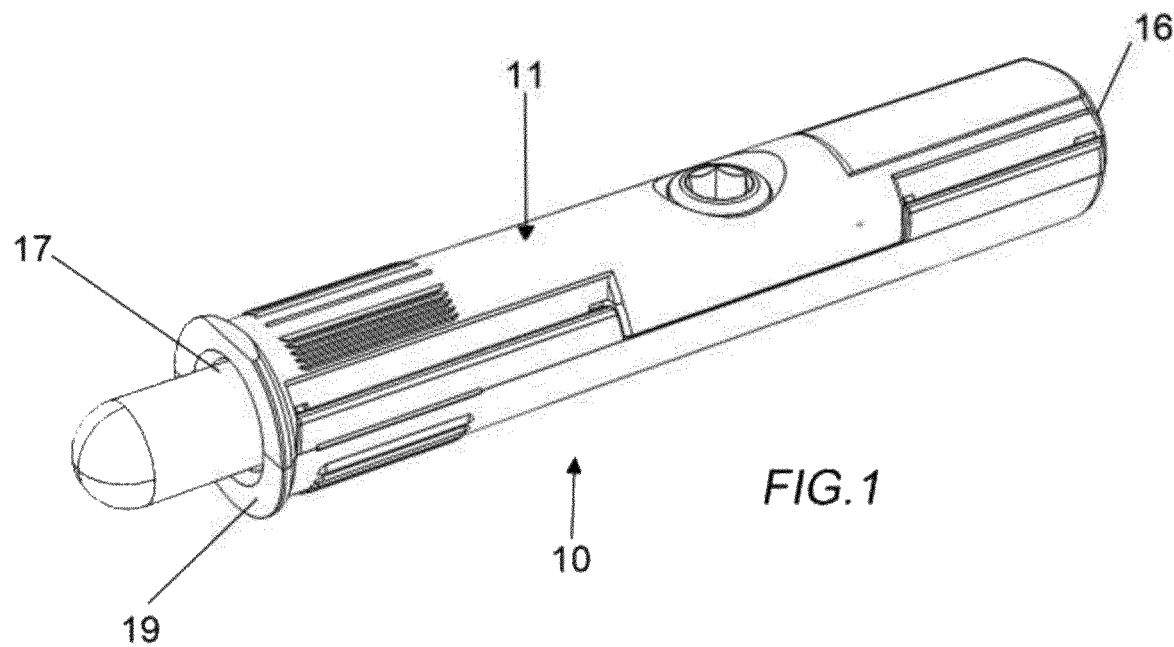
FIG. 1a is a view of the device of FIG. 1 taken from the opposite side.

Referring to the aforementioned drawings, the device for supporting and fixing furniture shelves according to the present invention, denoted overall by reference numeral 10, comprises an outer body or casing 11 with substantially cylindrical shape, inside whereof is mounted a pin 12 which is stressed by a compression spring 13.

The device 10 is inserted into the thickness of a shelf 21 of a furniture item 20 (FIGS. 9-11) with the front surface of the casing 11 flush with the edge of the shelf, and the pin 12 protruding therefrom to be inserted in a hole 23 formed in a corresponding vertical wall 22 of the furniture item, as will be made clearer below.

The casing 11 is made in two half-shells, a lower half-shell or base 14 and an upper half-shell or cover 15 which, joined together, determine the aforementioned hollow cylindrical conformation closed at one end 16 which is placed in the thickness of the shelf 21 and open at the opposite end 17, from which the pin 12 protrudes.

The casing 11 is provided externally with a serrated portion 18 formed axially along a part or the whole of its longitudinal development with the function of ensuring a greater grip on the inner surface of the housing hole formed in the furniture shelf and provided, likewise, at the open end 17, with an annular expansion or collar 19 having the function of defining a stopping element when it is introduced into said hole of the shelf.

The casing 11 is preferably made in plastic material or Nylon or in another known equivalent material suitable for the purpose, not excluding metallic material, while the pin 12 is in metal or hard plastic. The spring 13 is obviously metallic.

The pin 12 has a cylindrical front section 30 which can protrude at least partially from the open end 17 of the casing 11 and ending with an ogival tip 31, an intermediate section 32, whose particular conformation will be explained here below, and a rear section 33, also cylindrical, but of smaller diameter, so as to be able to fit into the helical spring 13 which abuts between said central section 32 of the pin and the closed rear wall 16 of the casing 11.

Naturally, the tip 31 of the pin may have a different conformation from the one illustrated, it being in any case preferable that it is rounded to have easier sliding against the corresponding vertical wall 22 of the furniture item, when it interferes with it during the insertion and extraction of the shelf 21.

The intermediate section 32 of the pin 12 is flattened at the top, where it has a flat surface 34 delimited by a front shoulder 35 and a rear shoulder 36, against which the aforementioned spring 13 abuts.

In this flat surface 34 a longitudinal slot 37 is formed, which at least partially involves the entire thickness of the pin 12.

On one side of the slot 37 two projections 38 are provided, protruding beyond the profile of the pin 12, which determine between them an open space 39 serving the purposes that will be mentioned here below.

Figure 1A:
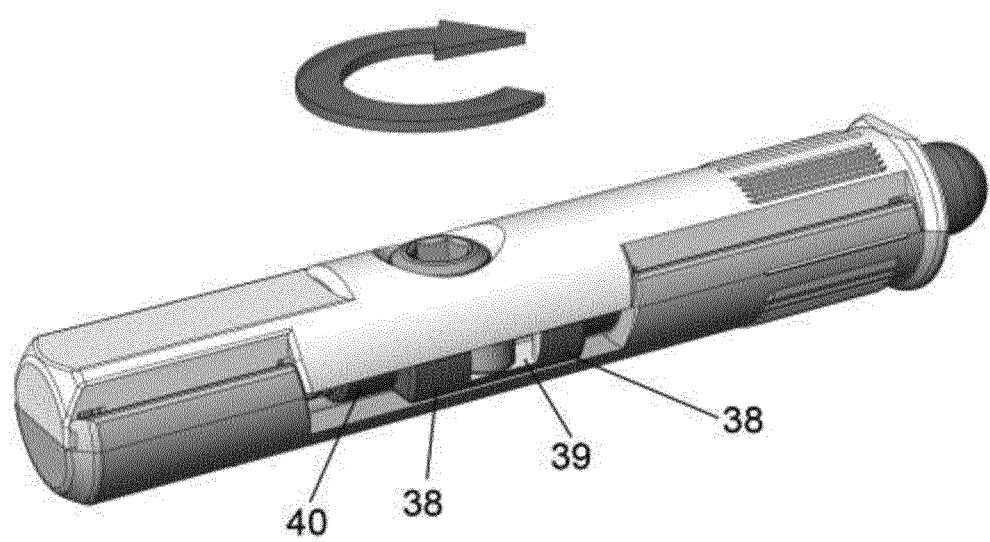

Following the coupling of the two half-shells 14, 15 of the casing 11, on the side where said projections 38 are provided, a window 40 (see, in particular, FIGS. 1a and 3) is determined, extending approximately along the length of the intermediate section 32 of the pin 12, and in which the aforesaid projections 38 are housed, with the possibility of sliding, during the axial movement of the pin 12, as will be stated now.

Figure 2:
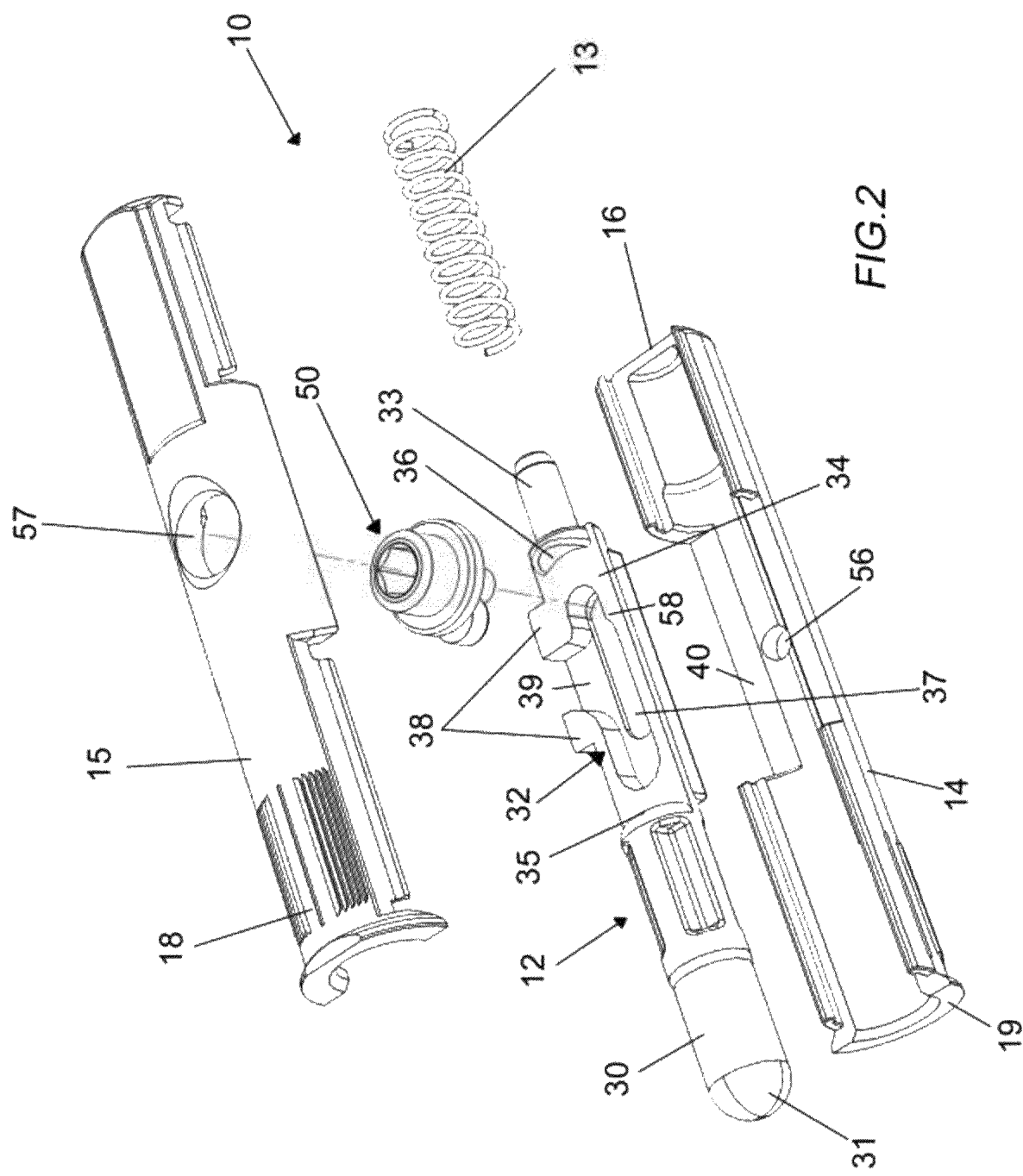
FIG. 2 is a blown-up axonometric view of the device of FIG. 1.
Figure 2A:
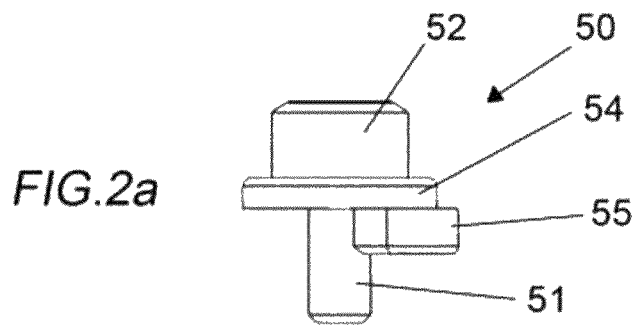
FIGS. 2a, 2b, 2c are, respectively, a side elevation view, a view from above and a view from below of a cam element forming part of the device.
Figure 2B:
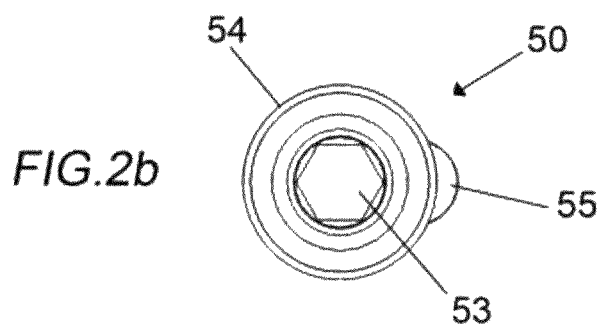
Figure 2C:
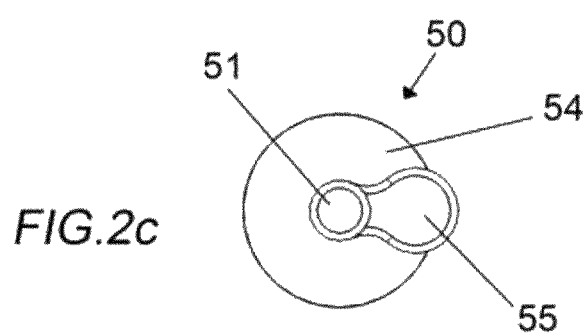

In fact, a cam element 50, shown separately in FIGS. 2a, 2b, 2c, is provided for moving the pin 12.

With reference to the orientation shown in the drawings, the cam element 50 has a lower cylindrical section or shaft 51, of smaller diameter, acting as axis of rotation of the cam element, traversing the slot 37 and partially housing in a hole 56 formed in the lower half-shell 14, and a head 52, of larger diameter, coaxial thereto, provided with a shaped seat 53, for example with polygonal section, for engaging a manoeuvring key, such as an Allen key, housing in a corresponding hole 57 formed in the upper half-shell 15.

Below the head 52, a disk enlargement 54 is provided that goes to rest on the flat surface 34 of the intermediate section 32 of the pin 12 and, below the disk 54, an eccentric lobe 55, projecting beyond the disk 54 and acting as a cam proper, normally placed in the slot 37, but with the possibility of occupying, with its protruding part, the space 39 between the projections 38 during the rotation of the cam element 50.

Having described the structure of the shelf support device according to the invention, its functioning is illustrated with reference to the sequence of FIGS. 4 to 8.

In FIG. 4, the device is shown in the configuration of use, with the shelf 21 mounted, in which the front section 30, with the tip 31, of the pin 12 is inserted for the maximum possible extension in the vertical wall 22 of the furniture item 20.

In this condition, the lobe 55 of the cam element 50 is placed in the front part of the slot 37 and the pin 12 could spring freely, the maximum extraction of the tip 31 being determined by the rear shoulder 36 of the flat surface 34, against which the disk 55 of the cam element 50 abuts.

In order to disassemble the shelf, starting from the condition of FIG. 4, it is necessary to make the front section with tip of the pin 12 re-enter the casing 11.

For this purpose, the inserting of a maneuvering key into the seat 53 of the cam element 50, through a hole 25 formed in the shelf, causes the rotation thereof clockwise, bringing the eccentric lobe 55 in engagement with the rear projection 38 protruding from the slot 37, thus causing the retraction of the tip, as shown in FIGS. 5 and 6.

By further rotating the cam element 50, the lobe 55 is again placed in the slot 37 (FIG. 7), on the opposite side to that of FIG. 4. In this condition, the pin 12 is in the position of maximum re-entry in the casing 11, determined by the cam element 50, with only the ogival tip 31 protruding therefrom, held in this position by the lobe 55 which abuts against a narrowing 58 (see also FIG. 1) of a wall of the slot 37.

Figure 8A:
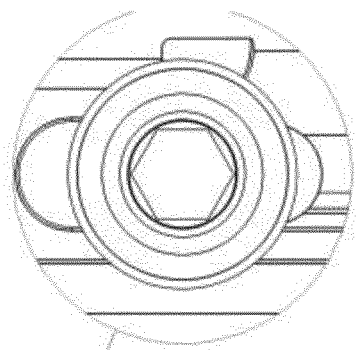
Figure 8:
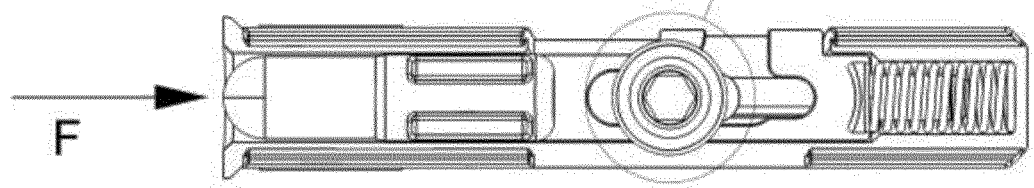

In the condition of FIG. 7, the pin 12 is again free to spring to retract further into the casing 11, as indicated by arrow F in FIG. 8.

Therefore, by exerting a push on the shelf, the ogival tip 31 interferes against the edge of the hole 23 formed in the vertical wall of the furniture item and fully retracts into the casing 11, allowing the shelf to be released.

Figures 9, 9A, 9B:
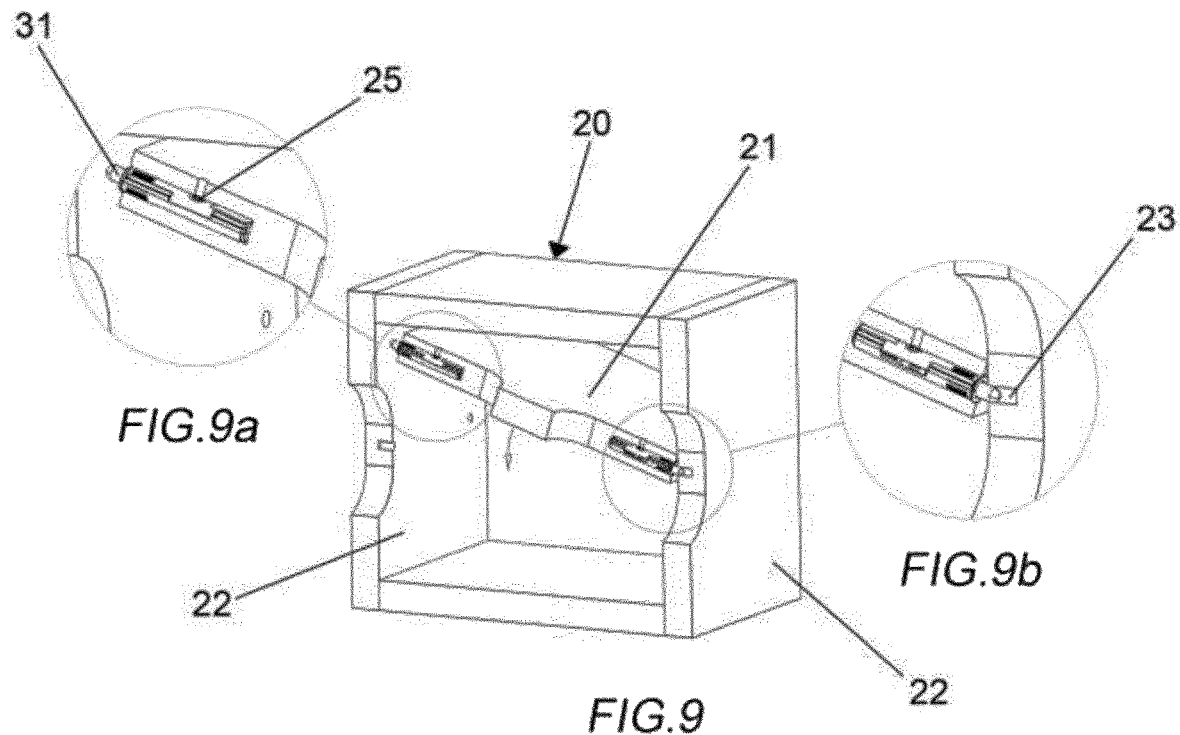
FIGS. 9, 10, 11 are schematic axonometric views with cutaway parts showing successive stages during assembly of a shelf.
FIGS. 9a and 9b, 10a, 11a, are enlargements of the details circled in FIGS. 9, 10, 11, respectively.
Figures 10, 10A:
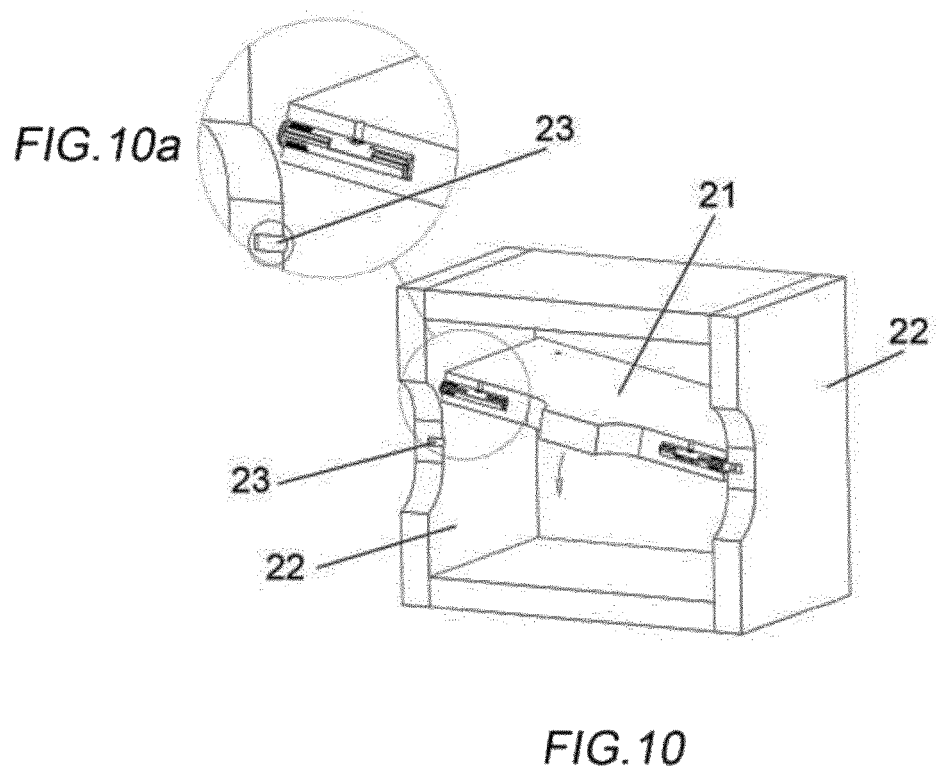
Figures 11, 11A:
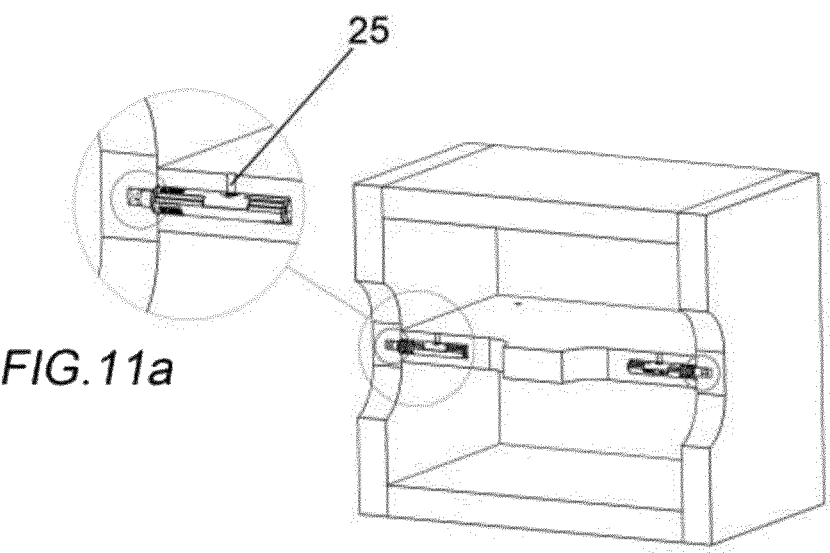

The assembly of the shelf is schematically illustrated in the sequence of FIGS. 9 to 11.

The cam element is returned into the position of FIG. 4 by a 180° anticlockwise rotation in such a way that the tip 31 protrudes from the casing 11 and can spring freely to re-enter therein. Then, bringing it in interference with the vertical wall of the furniture item (FIG. 9), it slides along this wall moving backwards, until it is aligned with the hole 23 into which it snaps (FIG. 11).

It should be noted that with the device for supporting and fixing furniture shelves according to the invention, the mounting of the shelf can be carried out easily, keeping the cam element 50 in the position shown in FIGS. 7 and 8, i.e. with the lobe 55 placed in the rear part of the slot 37 and with only the ogival tip 31 protruding from the casing 11, in such a way that it can slide more easily against the vertical wall of the furniture item and be inserted in the corresponding hole 23, after which the cam element rotates through 180° in order to free the spring 13 and cause the further exit of the tip 31, determining a secure fixing of the shelf.

From what has been disclosed, the advantages of the invention, which enables rapid assembly and disassembly of furniture shelves, without leaving any visible parts, appear clear.

Although the invention has been described above with particular reference to one of its embodiments given purely by way of a non-limiting example, numerous changes and variations will be apparent to a person skilled in the art in the light of the description given above. The present invention, therefore, is intended to embrace all changes and variations that come within the scope of the following claims.

The invention claimed is:

1. A device comprising:
    a casing having a substantially cylindrical shape;
    a pin received within said casing;
    a compression spring urging against said pin within said casing, said casing configured to be inserted into an edge of a shelf such that said pin has a first position of maximum protrusion from said casing and a second position of minimum protrusion from said casing, said pin being retractable into said casing from each of the first position and the second position upon an application of a force onto said pin when said pin bears against a surface;
    a cam element cooperative with said pin so as to actuate said pin between the first position and the second position, said pin compressing said compression spring when said cam element actuates said pin to move from the first position to the second position, wherein said cam element has an eccentric lobe which has one position in a longitudinal slot of said pin and another position in the longitudinal slot of said pin so as to correspond to the first position of said pin and the second position of said pin, respectively, wherein said pin has a flat surface delimited by a front shoulder forward of the longitudinal slot and a rear shoulder rearward of the longitudinal slot, wherein the longitudinal slot is recessed from the flat surface, wherein said cam element is configured to act against a projection protruding from one side of the longitudinal slot beyond a profile of said pin, wherein said pin is movable between the first position and the second position upon a rotation of said cam element; and
    a window formed in said casing, the projection moving in said window when said pin slides between the first position and the second position.

2. The device of claim 1, wherein the first position of said pin is to correspond to a mounting and fixing of the shelf with a furniture item, the second position of said pin is to enable a process for a removal of the shelf from the furniture item.

3. The device of claim 1, wherein said cam element comprises:
    a disk formed immediately above the lobe;
    a lower shaft that acts as an axis of rotation; and
    an upper head with a seat that is adapted to receive a maneuvering key.

4. The device of claim 3, wherein an intermediate section of said pin defines the flat surface of said pin.

5. The device of claim 3, wherein said casing comprises:
    a lower half-shell; and
    an upper half-shell joined to said lower half-shell so as to define said window therebetween.

6. The device of claim 5, wherein said lower shaft of said cam element is housed in a hole formed in said lower half-shell, and said upper head of said cam element is housed in a hole formed in said upper half-shell.

7. The device of claim 1, wherein a tip of said pin has an ogival shape.

8. The device of claim 1, wherein said compression spring acts between a closed wall of said casing and said pin.

* * * * *